Inventor
RICHARD C. HUG

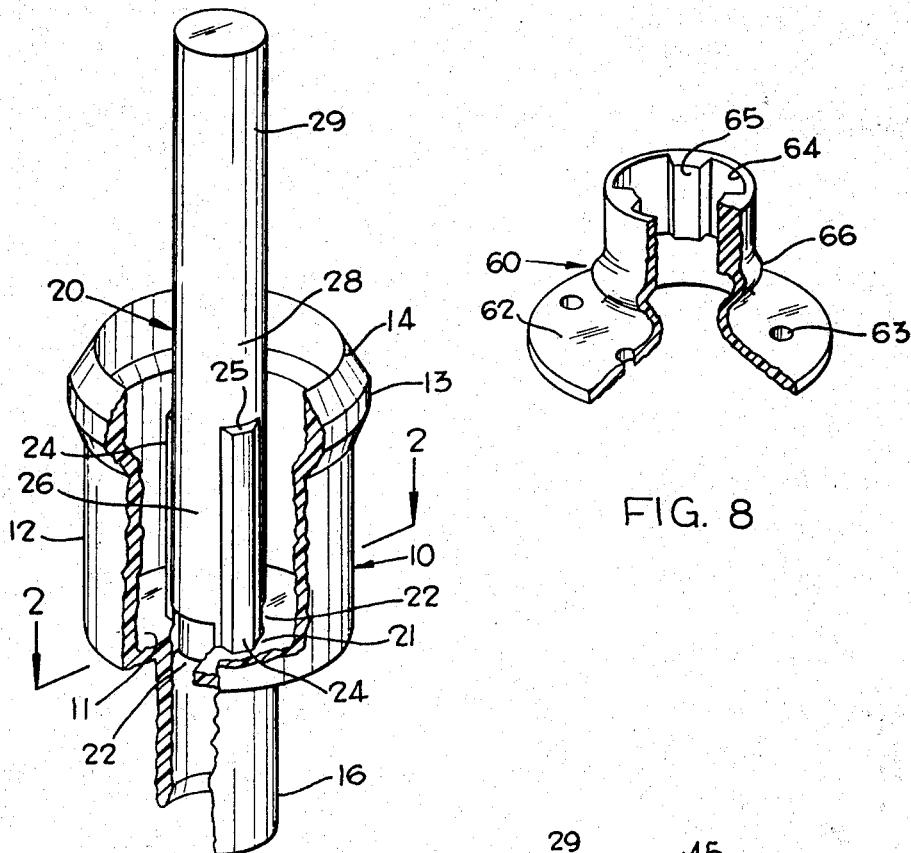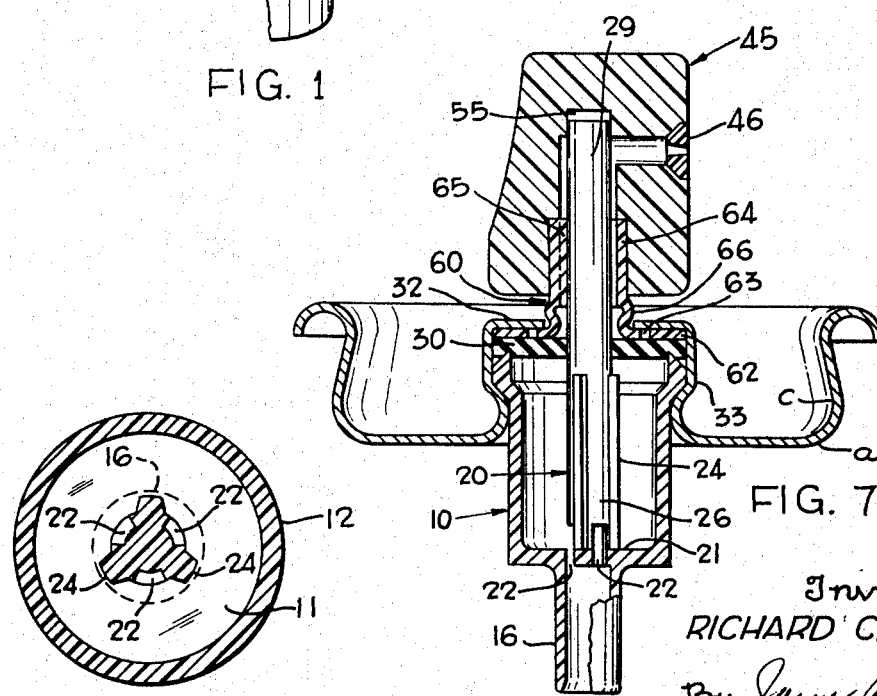

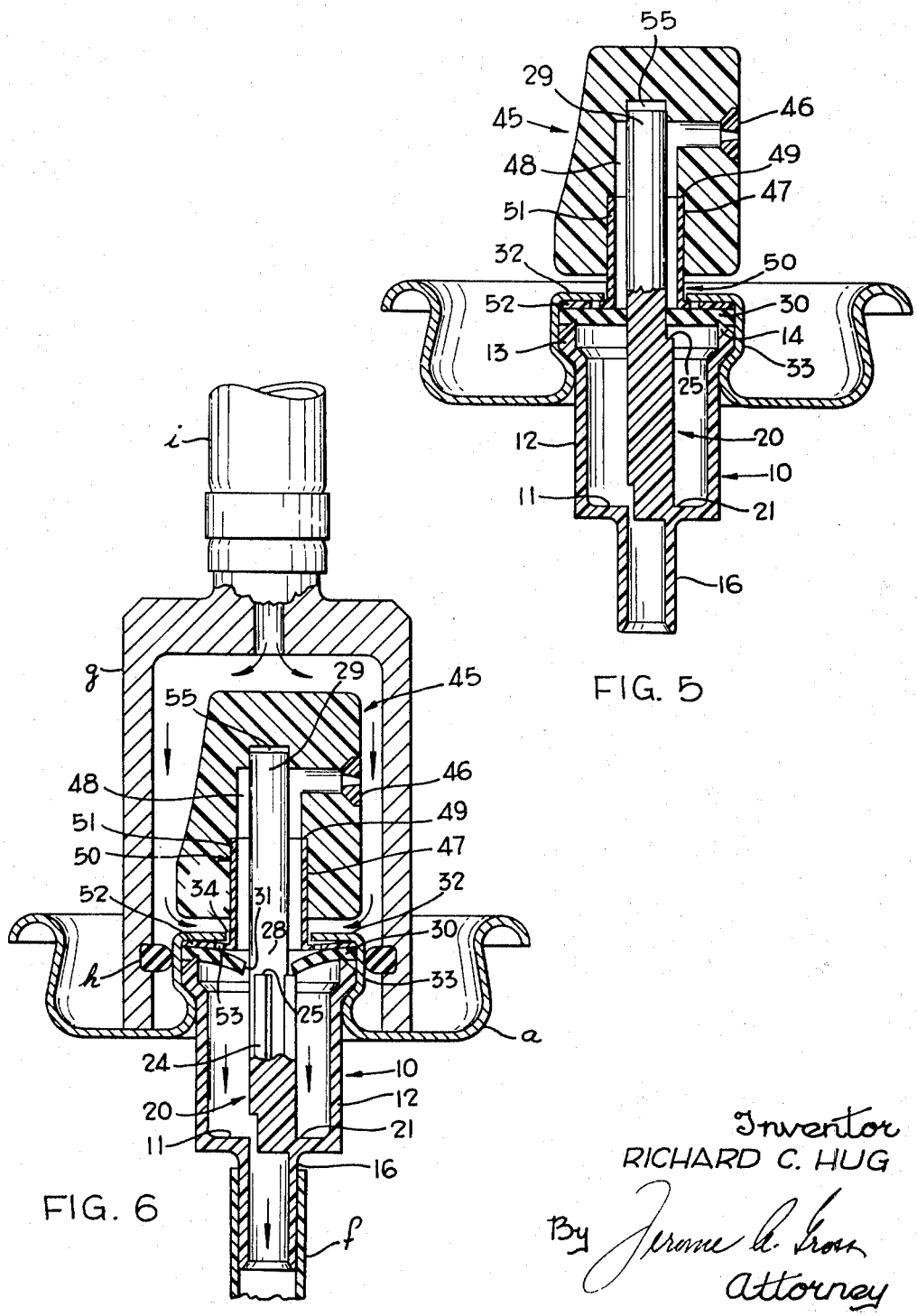

United States Patent Office 3,438,610
Patented Apr. 15, 1969

3,438,610
HEADLESS VALVE ASSEMBLY FOR
DISPENSING CONTAINERS
Richard C. Hug, St. Louis, Mo., assignor to Clayton Corporation, St. Louis, Mo., a corporation of Delaware
Filed Apr. 21, 1967, Ser. No. 632,615
Int. Cl. F16k 13/00; B65d 83/14
U.S. Cl. 251—303          15 Claims

ABSTRACT OF THE DISCLOSURE

A valve for single use aerosol dip tube dispensers has no valving head. The molded plastic cup, to which the dip tube is mounted, has a valve stem rising integrally. The base of the cup serves as a fulcurm for the stem, which passes upward through the bore of a sealing washer and through a larger opening in the container top above the washer. A dispensing head is mounted on a flexible flanged sleeve in this opening. Application of a lateral force will deflect the stem about its fulcrum, distending the sealing washer sufficiently to permit outflow.

BACKGROUND OF THE INVENTION

Valves for single use pressurized dispensing containers, such as are commonly used for products to be dispensed as sprays and foams, must be fairly inexpensive in construction, and also must permit the dispensers to be gassed quickly. The preferred method of gassing is first to fill the container, then sealingly crimp in place the top mounting cup which serves as part of the valve assembly, and then to pressurize the container by introducing gas through the valve.

Prior valves typically include headed valve stems which seat against the lower inner surface of a resilient sealing washer or molded grommet. Their stems are either tubular or solid; solid stems are not grasped sealedly by the bore of the grommet. Some such valves are operated by a purely axial downward movement; others are referred to as tilt-operating. However, for permitting the inflow of pressurizing gas, the stems of both types move axially downward. Even to discharge the tilt-operating type, some component of downward stem movement is induced; on tilting about a point of rotation above the head, one side of the head bears against the washer to draw the stem axially inward.

SUMMARY OF THE INVENTION

In the present valve, the stem cannot move axially at all, nor has it any head to press upward against a sealing seat. Instead the stem is an erect valve member which passes through the bore of an elastical sealing washer and then upward through an opening in the container top. The base end of this erect valve member rises, preferably integrally, from the bottom of a cup-like member, used to mount the dip tube and whose upper rim clamps the washer to the container top.

Strengthened by the dip tube mounting flange around the bottom flow opening into the cup, the cup bottom serves as a fulcrum which secures the base end of the erect valve member against lateral movement. A lateral force applied against the outward projecting upper portion of this valve member will so tilt it about such fulcrum as to distend the sealing bore elastically, release its sealing grasp, and thus permit discharge of the container contents.

The thickness of the sealing washer is so great, relative to the gap in the central opening of the top alongside the stem, as to avoid any outward deflection of the washer, from internal pressure, which might result in loss of its sealing grasp. However, compared to the radial distance from the stem to the rim which clamps the washer in place, the washer's thickness is sufficiently less to permit inward deflection, resulting in unsealing the valve when pressurizing gas is externally applied. Thus without any axial movement of the erect valve member, the pressurizing gas may be introduced through the valve into the container.

Preferably a flexible flanged sleeve is inserted on assembly, to project with clearance around the stem, the flange being sealed between the container top and the sealing washer. Gassing openings in the flexible flange beneath the top and the sealing washer are open by downward flexure away from the container top; this permits the pressurizing gas to bend the washer downward and thus distend its bore. A dispensing head is mounted on the outward projecting sleeve.

Lateral force to open the valve may be applied to the stem member either by the dispenser head or by inward projections on the flanged sleeve. Other inventive features are set forth in the following description of preferred embodiments of the invention.

BRIEF DESCRIPTION OF THE DRAWINGS

In the accompanying drawings:

FIG. 1 is an enlarged perspective view from above, partly fragmentary, of a valve member formed integrally with a cup-like adapter or nipple member as utilized in the present invention.

FIG. 2 is a horizontal section taken along line 2—2 of FIG. 1.

FIG. 5 is an alternate embodiment showing the integral member of FIG. 1 assembled with a flanged sleeve, on which a rigid spray head is mounted.

FIG. 6 is a view of the assembly of FIG. 5 showing the positions of the parts as the container is gassed.

FIG. 7 is another alternative embodiment, including the integral member of FIG. 1 assembled with a flanged sleeve which incorporates actuating ribs.

FIG. 8 is an enlarged perspective view, partly fragmentary, of the flanged sleeve utilized in the FIG. 7 assembly.

DESCRIPTION OF THE PREFERRED EMBODIMENTS

Figure 3:
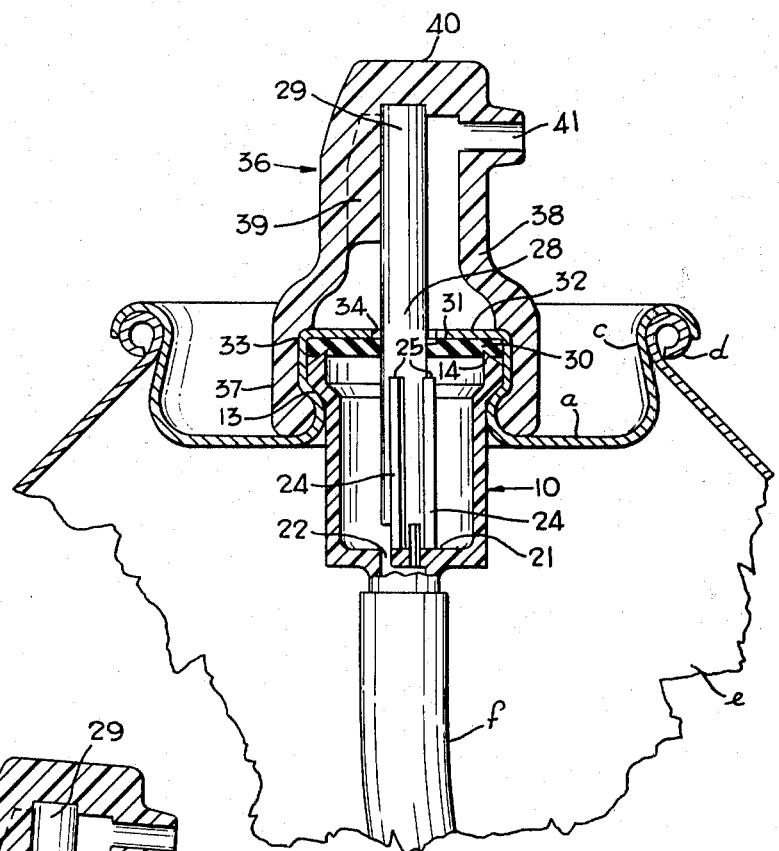
FIG. 3 is a vertical section of a valve assembly including the novel integral member of FIG. 1 mounted with a rubber washer in the pedestal portion of the mounting cup of a dispensing container, with a flexible foam-dispenser nozzle affixed.

FIG. 1 illustrates the novel adapter or dip tube-holding cup, designated 10, molded of fairly rigid plastic material with an integral valve stem portion rising integrally from the center of the cup bottom. The adapter 10 has a cup base portion 11 and cylindrical cup wall 12 which terminates in an outwardly flanged rim 13 having a sharp tapered upper edge 14. At the center of the base portion 11 is a downward projecting hollow cylindrical dip tube mounting flange 16, which serves as the entrance to the several flow openings through the base portion 11, and also reinforces it in securing the base end of the integral valve member, now to be described.

Arising from the base portion 11, in registration with the bottom opening in the dip tube mounting flange 16, is a normally erect valve member which, though preferably formed integrally with the adapter 10, is generally designated 20. At its base end 21 it has a junction integral with the base portion 11. In order to provide flow openings past the base end junction 21 from the dip tube mounting flange 16 into the wall 12, the base end junction 21 is interrupted by three perforations or ports 22;

which as best seen in the cross-sectional view FIG. 2, are angularly spaced along the perimeter of the inner diameter of the mounting flange 16. The ports 22 are molded by prongs on the end of the mold core pin which forms the hollow in the dip tube mounting flange 16. The ports 22 lessen the amount of the material at the valve member's base end junction 21 and hence reduce its resistance to tilting.

Alternating angularly with the ports 22 are flute-like external projecting ribs 24 which extend from the base end 21 upward along the valve member 20 to a level spacedly below the cup edge 14, where they terminate in upwardly presented shoulders 25. The shoulders 25 and the base end junction 21 demarcate the upper and lower ends respectively of what is herein referred to as the inner portion 26 of the valve member 20. Thereabove the surface of the member 20 is cylindrical, this portion being referred to as the intermediate pin-like portion 28. The upper, or actuating portion 29, of the valve member may also be cylindrical, as shown in FIG. 1, or it may optionally incorporate special provisions for securing an actuating head thereon.

The erect valve member 20 is intended to operate by tilting above its base end junction 21 as a fulcrum when a lateral force is applied to the upper portion 29. The cup base portion 11 serves as means, located spacedly below the sealing washer hereafter described, to secure the base end junction 21 of the valve member 20 against lateral movement, so that the valve member 20 will act as a lever to distend the sealing washer.

Figure 4:
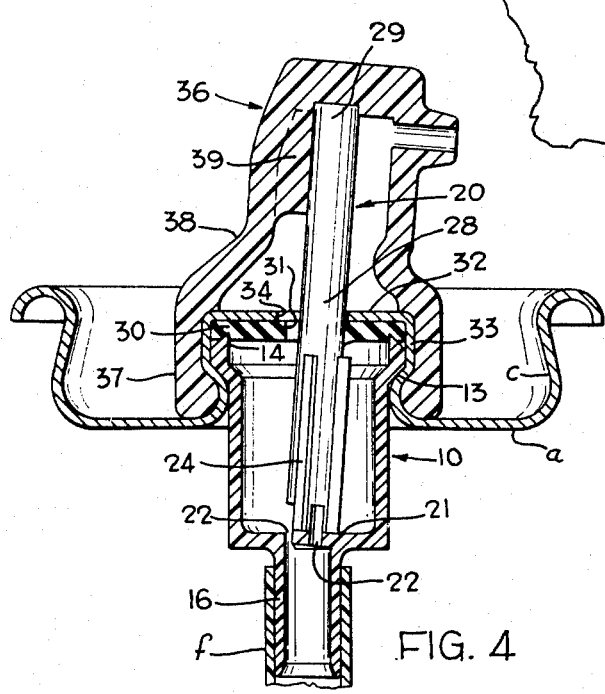
FIG. 4 is a view of the FIG. 3 assembly showing the position of the parts during dispensing.

Referring now to the simple embodiment of the invention shown in FIGS. 3 and 4, the adaptor 10 is shown clamping a rubber sealing washer, generally designated 30, against the underside of an annular horizontal surface 32, which is the top of a pedestal portion 33 of a conventional metal mounting cup $a$, the cup being mounted by crimping its inner rim wall $c$ within the mouth $d$ of a pressure container $e$. The washer 30 is rubber, with a central sealing bore 31 which as formed is slightly smaller in diameter than the intermediate pin-like portion 28 of the valve member 20, so as to grasp it sealedly. The annular surface 32 of the pedestal portion 33 has a central opening 34 concentric with and of greater diameter than the sealing bore 31 of the washer 30, so that the pin portion 28 extends through the opening 34 with substantial clearance. In this embodiment (that is without use of a flanged sleeve such as is shown in the alternate embodiments FIGS. 5 and 7) its clearance within the central opening 34 is limited to less than the thickness of the washer 30; that is, this thickness exceeds the difference in radii of the central opening 34 as compared with that of the sealing bore 31. The elastic washer 31 is effectively restrained by the top member 32 from outward deflection in and through the opening 34, despite internal pressure within the container, and the sealing grasp of the washer 30 on the pin portion 28 of the valve member 20 will be retained.

The edge 14 provides a circular line of clamping the washer 30 to and against the annular horizontal surface 32; clamping is effected by crimping the side of the pedestal portion 33 under the rim 13, as shown in FIG. 3. As will be described in connection with FIG. 6, for gassing through the valve, externally applied gas pressure must bend the washer 30 inwardly of its line of clamping, to elastically enlarge the sealing bore 31 and release its sealing grasp. I have found this result will follow, using rubber conventional for pressure dispenser seals, by having the radius of the adapter edge 14 exceed the radius of the pin-like portion 28 by an amount greater than the thickness of the washer 30. The upper shoulder ends 25 of the ribs 24 are so located below the level of the cup edge 14 as to limit the extent of such inward bending to that required for gassing.

Shown in FIGS. 3 and 4 is a flexible plastic actuator head generally designated 36. It includes a skirt portion 37 which engages the outer side of the pedestal portion 33, a flexible tubular wall 38 (which spacedly surrounds the upper valve stem portion 29, and is enlarged inwardly at the rear to provide an actuating abutment 39 to bear against the upper valve stem portion 29) a top wall 40, and a side nozzle outlet 41.

FIG. 4 shows how the valve assembly of FIG. 3 operates. When a lateral force is exerted through the wall 38 and the abutment 39 against the upper stem portion 29, the base end 21 serves as a fulcrum; the valve member 20 will so tilt thereabove as to cause the intermediate pin-like portion 28 to bear forcibly against and elastically distend the washer's central sealing bore 31 to release its sealing grasp. With a dip tube $f$ mounted to the mounting flange 16, the container contents will pass through the dip tube $f$, mounting flange 16 and ports 22 into the cup portion of the adapter 10; and will then pass along the valve member 20 through the distended central sealing bore 31, to enter the plastic actuator head 36 and be discharged through its nozzle outlet 41. When such lateral force is released, the elasticity of the sealing washer 30 (and to a lesser extent, of the base junction 21) will restore the valve member 20 to erectness and the sealing grasp of the washer bore 31.

The alternate embodiment of FIG. 5 is useful where a conventional rigid dispensing head generally designated 45 is supplied mounted on the valve and is not to be removed for gassing, especially where its outlet is a spray outlet 46, too small to permit gassing through it. FIG. 6 shows how gassing is accomplished, In these figures, parts which correspond precisely to those of the first-described embodiment are marked with similar numbers, and their descriptions will not be repeated.

For mounting the dispensing head 45, an enlarged counter bore 47 is provided in the lower end of the vertical portion of its flow passage 48, thus presenting a downward shoulder 49. Within the counter bore 47 is fitted the sleeve portion 51 of a flanged sleeve member generally designated 50. The sleeve portion 51 extends spacedly around the valve member 20, downward from the shoulder 49 and through the central opening 34, where it is fitted loosely. At its lower end immediately beneath the opening 34 is an integral, thin, radially outward extending flange portion 52, presented and clamped between the annular surface of the top member 32 and the sealing washer 30, as shown in FIG. 5.

The flange portion 52 is flexible, and is penetrated by a plurality of gassing openings 53 spaced in a circle outward from the center of the bore 31 of the sealing washer 30 such distance as to locate the openings 53 beyond the central opening 34, but radially inward of the line of clamping of the cup edge 14. Normally these gassing openings 53 will be held closed against the horizontal surface 32 of the mounting cup pedestal by internal gas pressure pressing the rubber washer 30 tightly against them, as shown in FIG. 5. Gas is inserted by means of a gas pressure head $g$ as shown schematically in FIG. 6, superimposed over the actuator 45 and lowered until its internal ring seal $h$ seals against the side of the pedestal portion 33. Gas entering the head $g$ through the gassing tube $i$ will pass to the undersides of the dispensing head 45, as shown by the arrows of FIG. 6, and then past the outer side of sleeve portion 51, in the clearance space provided within the pedestal top central opening 34. It will thus exert downward pressure against the flexible flange portion 52 of the sleeve member 51, and against the rubber washer 30 therebeneath to deflect both of them downward. Such downward deflection of flange portion 52 unseats its gassing openings 53 from the undersurface of annular surface 32, permitting the pressurizing gas to further deflect the washer 30 and flow through the gassing openings 53. This downward deflection of the rubber washer 30 so distends its central sealing bore 31 as to release its grasp on the valve member 20 and permit the inflow of the pressurizing gas down along its pin portion 28 and between the ribs 24 into the cylindrical cup wall 12, then through the ports 22 in its base portion 11, and through the dip tube f into the container e. The upwardly presented shoulders 25 on the valve ribs 24 serve as a stop to limit downward deflection of the rubber washer; in the event extremely high external pressures were applied, it would cause no dislocation or permanent distortion of the rubber 30.

As shown in FIG. 6, with the downward deflection of the sleeve member 50, the rigid dispensing head 45 will also move downwardly. The valve member 20 is incapable of any such downward movement. Accordingly its upper actuating portion 29 is formed as a cylinder, fitted slidably within a molded cylindrical bore 55 in the rigid dispensing head 45. When the head 45 moves downward, the bore 55 moved downward relative to the upper valve portion 29, as is seen by comparing FIG. 5 with FIG. 6.

Lateral pressure applied to the rigid dispensing head 45 will be directed against the upper valve member portion 29 to operate the valve in the same manner as in the first-described embodiment whose operation is shown in FIG. 4. Thus the interfit of the upper portion 29 within the cylindrical bore 55 serves as a radially rigid means to so interconnect the valve member 20 with the dispensing head 45 as to tilt it and yet permit the relative axial motion necessary for gassing.

In the embodiment shown in FIG. 7, a modified flange sleeve member generally designated 60, is utilized, as illustrated in FIG. 8. It includes an outwardly extending flexible flange portion 62 penetrated by a plurality of gassing openings 63 spaced similarly to those of the embodiment shown in FIGS. 5 and 6. It has a sleeve portion 64 from whose inner surface project several angularly spaced fins 65; these bear against the valve member 20 spacedly above the level of the top annular surface 32 of the mounting cup pedestal 33. A lateral force applied through a dispensing head 45 is transmitted to the valve member 20 by the fins 65 as well as by the cylindrical bore 55.

Uniquely in this embodiment, the sleeve member 60 has at the junction of the sleeve portion 64 and the flange portion 62 a zone of flexibility, both radial and axial. This flexibility is here furnished by a single bellows-like wall undulation 66. This permits radial deflection of the sleeve portion 64 out of concentricity with the flange portion 62; hence the fins 65 may move laterally to tilt the stem 20. The same bellows-like wall undulation 66 also absorbs the axially downward movement of the flange portion 62 on gassing; hence gassing causes no relative movement between the cylindrical bore within the head 55 and the upper portion 29 of the valve member 20.

All the embodiments shown are characterized by simplicity of manufacture and construction, due largely to the small number of parts and their design for easy assembly by machine. Further modifications of detail will occur to those familiar with the art. Accordingly this invention is not to be construed narrowly, but rather as fully coextensive with the claims.

I claim:

1. A headless valve assembly for dispensing containers, comprising:
    a rubber-like elastic sealing washer having a central sealing bore,
    a rigid top member having an annular surface above the sealing washer, whereby to resist internal pressure against the washer, and having a central opening concentric with, and of greater diameter than, the sealing bore of the washer,
    an erect valve member including an inner portion having a base end spacedly below the washer, an upper portion projecting outward of the top member, and an intermediate pin-like portion extending through and sealingly grasped by the sealing bore of the washer, and extending thereabove with substantial clearance through the central opening of the top member, and
    means spacedly below the level of the washer to secure the base end of the valve member against lateral movement and to serve as a point of bending,
    whereby, on application of a lateral force against the upper portion of the valve member, said valve member will so tilt thereabove as to cause the intermediate pin-like portion to bear forcibly against and elastically distend the bore of the sealing washer and release its said sealing grasp and thus permit discharge of the contents of the container.

2. A headless valve assembly as defined in claim 1, characterized in that:
    the thickness of the washer exceeds the difference between the radius of the central opening through the top member and the radius of the sealing bore of the washer,
    whereby, despite internal pressure within the container, the rubber-like washer is effectively restrained by the top member from outward deflection in and through its opening, and the sealing grasp of the washer on the valve member is retained.

3. A headless valve assembly as defined in claim 1, further characterized in:
    having means to clamp the sealing washer against the top member along a circular line of clamping whose radius exceeds that of the pin-like portion by an amount greater than the thickness of the washer,
    whereby gas pressure externally applied for gassing the container will so bend the washer inwardly from the line of clamping as to elastically enlarge its sealing bore and release its sealing grasp on the valve member.

4. A headless valve assembly as defined in claim 3, further characterized in that:
    the inner portion of the valve member, spacedly between its base end and said pin-like portion, has a plurality of angularly spaced radially projecting shoulders, whereby to limit the extent of inward bending of the washer to that required for gassing.

5. A headless valve assembly as defined in claim 3:
    wherein the means to clamp the sealing washer includes the rim of a cup-like member having a flow opening below its said rim, and
    wherein the said means to secure the base end of the valve member includes the bottom of said cup-like member.

6. A headless valve assembly as defined in claim 5, characterized in that:
    the base end of the valve member has a junction integral with the bottom of the cup-like member.

7. A headless valve assembly for dispensing containers as defined in claim 6, characterized in that:
    the flow opening into the cup-like member is in its bottom at the base end junction of the valve member,
    whereby to lessen the resistance of the cup-like member to tilting of the valve member at said integral base end junction.

8. A headless valve assembly as defined in claim 6, further characterized in that:
    the flow opening comprises a hollow cylindrical dip tube mounting flange projecting downwardly from the bottom of said cup-like member and a plurality of perforations angularly spaced within the perimeter of the hollow of said mounting flange and penetrating said bottom at said base end junction of the valve member,
    in combination with angularly spaced flute-like projections on the exterior of the inner portion of the valve member, alternating angularly with said perforations and extending upward to a level spacedly below the washer, and there having upper end shoulders,
    whereby to limit the extent of inward bending of the worker.

9. A headless valve assembly as defined in claim 1, further having:
means to provide a flow passage from the opening of the top member to and around the upper portion of the valve member, and to transmit an externally-applied lateral force to said upper portion of the valve member.

10. A headless valve assembly as defined in claim 9:
wherein said means includes a flexible dispensing head mounted onto the container top member and surrounding the upper projecting portion of the valve member.

11. A headless valve assembly as defined in claim 9:
wherein the said means includes
a flange sleeve member having
a sleeve portion, fitted within the central opening of the top member, spacedly surrounding the valve member, and
a radially outward-extending flange portion at the lower end of said sleeve portion presented between the annular surface of the top member and the rubber-like sealing washer, and further includes
a dispensing head mounted on said sleeve portion.

12. A headless valve assembly as defined in claim 11, wherein:
the flange portion of said sleeve member is flexible and has a gassing opening spaced outward from the center of bore of the sealing washer beyond the opening in the top member,
whereby, on application of external gas pressure, the sleeve member will deflect downwardly to draw the gassing opening away from the annular surface of the top member, thereby to communicate the external gas pressure through the central opening of the top member and through the gassing opening to press against the elastic sealing washer.

13. A headless valve assembly as defined in claim 11, wherein:
the flange portion of said sleeve member is flexible and has a gassing opening spaced outward from the center of the bore of the sealing washer beyond the opening in the top member,
together with radially rigid, axial motion-permitting means interconnecting the upper portion of the valve member with the dispensing head,
whereby to transmit a lateral force, applied to the dispensing head, to actuate the valve member and yet permit the dispensing head to move downward relative to be valve member when the sleeve member deflects downwardly on such application of external gas pressure.

14. A headless valve assembly as defined in claim 11:
wherein the outward extending flange portion joins the sleeve portion at an annular junction characterized by radial flexibility,
whereby to permit displacement of the sleeve portion of the sleeve member from concentricity with the sealing bore of the washer and thereby to permit easy actuation of the valve member by a lateral force applied to said rigid dispensing head.

15. A headless valve assembly as defined in claim 14:
wherein the sleeve portion has spaced-apart inward projections bearing against the upper portion of the valve member,
whereby to transmit such lateral force from the dispensing head to the valve member by the displacement of the sleeve portion from such concentricity.

References Cited

UNITED STATES PATENTS

| | | | |
|---|---|---|---|
| 2,487,434 | 11/1949 | Geiss et al. | 222—394 |
| 2,746,796 | 5/1956 | St. Germain | 222—95 X |
| 2,779,514 | 1/1957 | Kebel | 222—394 |
| 2,881,808 | 4/1959 | St. Germain | 141—20 X |
| 3,036,743 | 5/1962 | Rhodes et al. | 222—394 |

HOUSTAN S. BELL, JR., *Primary Examiner.*

U.S. Cl. X.R.

251—342, 349; 137—525; 222—402.16, 402.21; 141—20